United States Patent [19]

Fordyce et al.

[11] 4,129,625
[45] * Dec. 12, 1978

[54] SELECTIVELY CONTROLLABLE WATER CURTAIN DAMPER FOR INLET FACE OF CIRCULAR WATER COOLING TOWER

[75] Inventors: Homer E. Fordyce, Kansas City, Mo.; William C. Carter, Lenexa, Kans.

[73] Assignee: The Marley Company, Mission, Kans.

[*] Notice: The portion of the term of this patent subsequent to Sep. 13, 1994, has been disclaimed.

[21] Appl. No.: 820,453

[22] Filed: Aug. 1, 1977

Related U.S. Application Data

[63] Continuation-in-part of Ser. No. 662,560, Mar. 1, 1976, Pat. No. 4,048,265.

[51] Int. Cl.² .............................................. F28C 1/04
[52] U.S. Cl. ...................................... 261/111; 261/67; 261/DIG. 11
[58] Field of Search ............... 261/111, DIG. 11, 110, 261/67

[56] References Cited

U.S. PATENT DOCUMENTS

| | | | |
|---|---|---|---|
| 2,512,271 | 6/1950 | Green | 261/DIG. 11 |
| 3,099,696 | 7/1963 | Meek | 261/DIG. 11 |
| 3,880,964 | 4/1975 | Fordyce et al. | 261/DIG. 11 |
| 4,048,265 | 9/1977 | Fordyce et al. | 261/DIG. 11 |

*Primary Examiner*—Frank W. Lutter
*Assistant Examiner*—Gregory N. Clements
*Attorney, Agent, or Firm*—Schmidt, Johnson, Hovey & Williams

[57] ABSTRACT

A simplified, selectively actuatable deicing apparatus for evaporative water cooling towers is provided which permits selective delivery of hot water from the upper distribution basin to the outer margin of the tower for deicing of the fill structure and inlet louvers thereof in order to maintain adequate airflow through the tower during sub-freezing ambient conditions. The deicing apparatus includes a substantially continuous slot in the bottom of the distribution basin adjacent its outer margin, in combination with valving devices for directing the flow of hot water through any selected segment of the slot to the underlying outer margin of the tower. The hot water carrying flume which feeds the distribution basin has a normal water level spaced above the bottom of the basin and is in direct flow communication with the latter at an elevation corresponding to its bottom such that a substantial part of the tower water is available for delivery through the selected segment of the slot. The increased volume of water presented to the slot creates a thick curtain of water along the portions of the outer margin below the open segment of the slot, which curtain temporarily blocks the inflow of sub-freezing ambient air whereby deicing of the tower by the cascading hot water is significantly enhanced.

10 Claims, 11 Drawing Figures

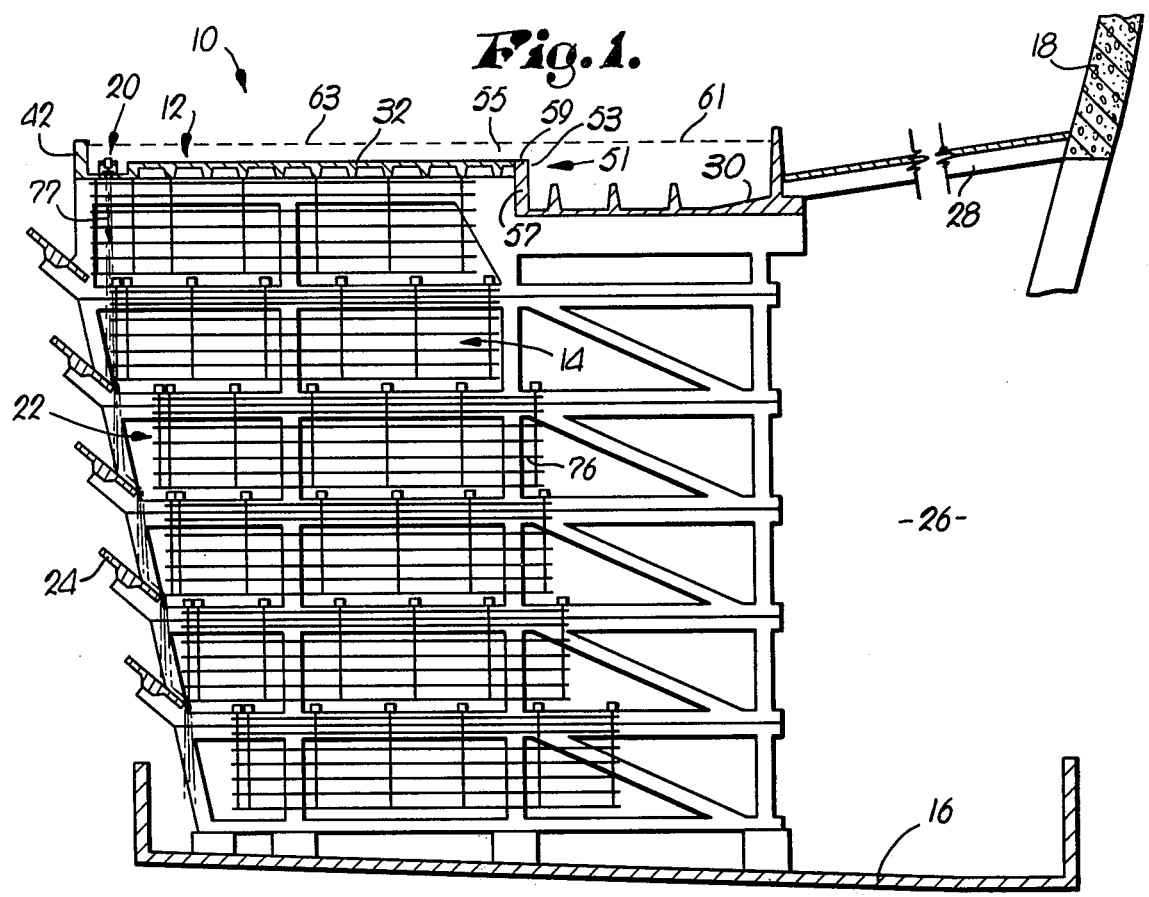
*Fig.1.*
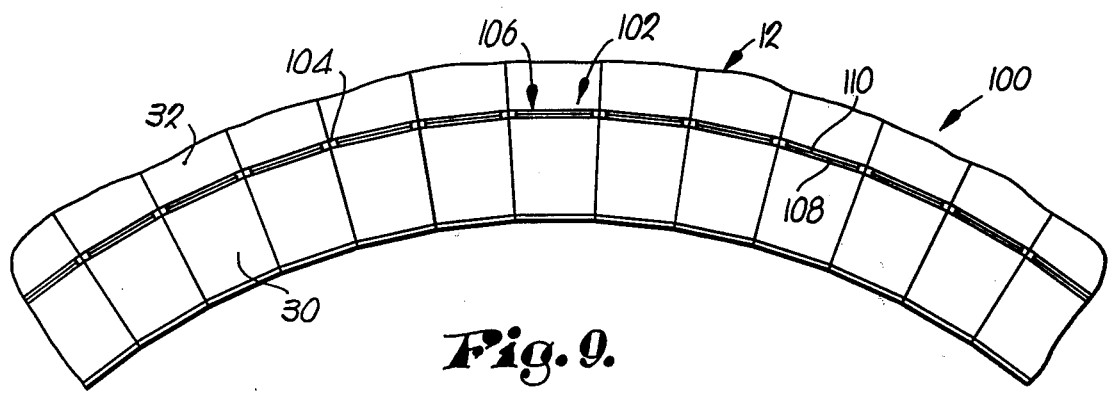
*Fig.9.*
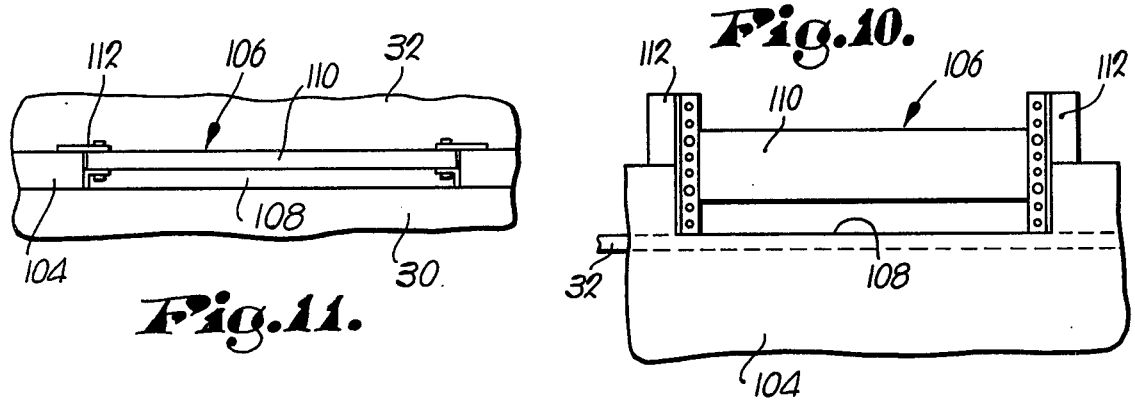
*Fig.11.*  *Fig.10.*

U.S. Patent  Dec. 12, 1978  Sheet 3 of 3  4,129,625
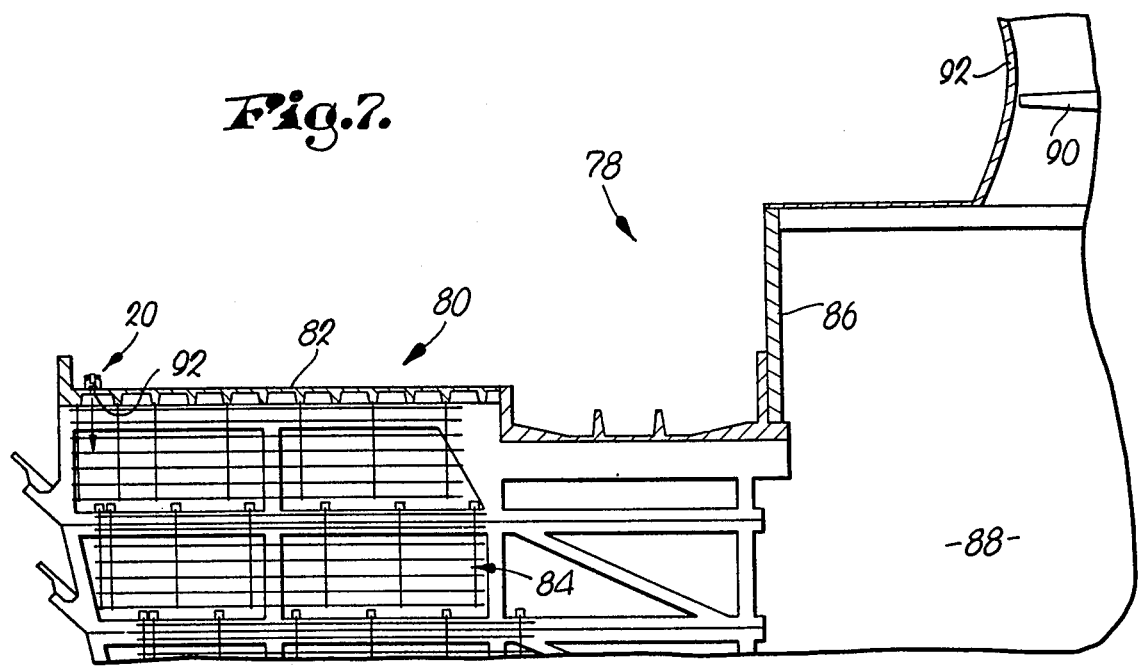
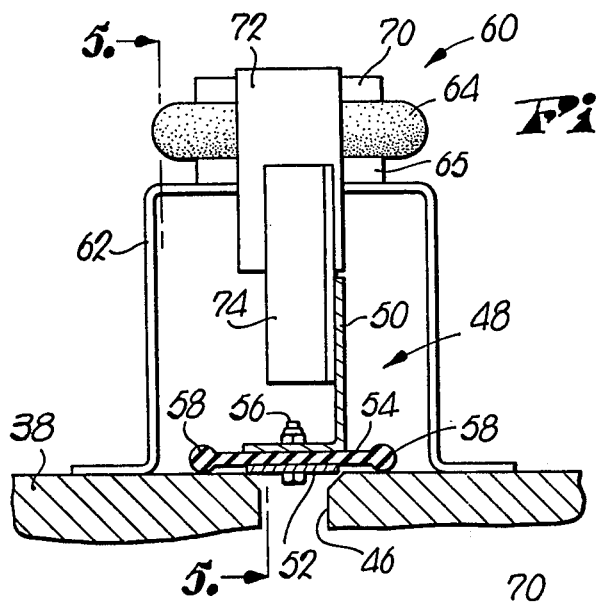
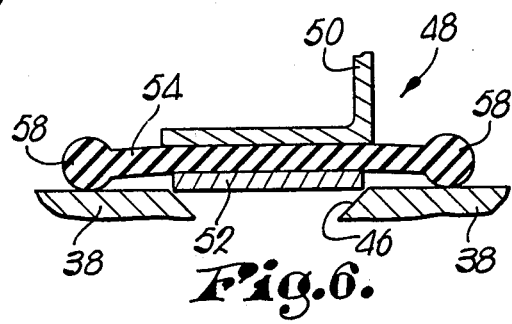
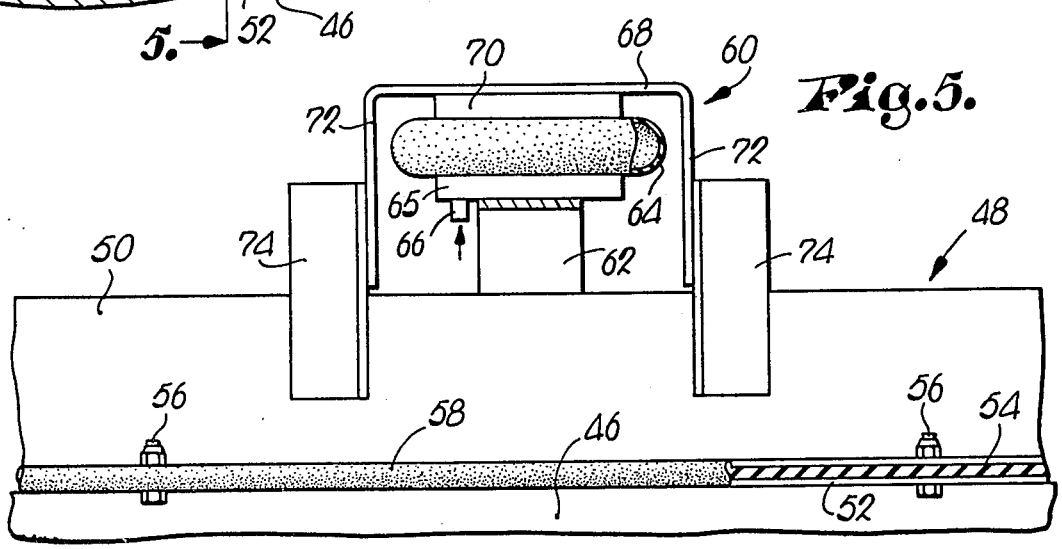

SELECTIVELY CONTROLLABLE WATER CURTAIN DAMPER FOR INLET FACE OF CIRCULAR WATER COOLING TOWER

This is a continuation-in-part of application Ser. No. 662,560, filed Mar. 1, 1976, now U.S. Pat. No. 4,048,265.

This invention relates to water cooling towers especially adapted for wintertime operations in cold climates by provision of specialized deicing apparatus for permitting selective deicing of the outer margin of the tower as necessary to ensure that tower performance is not lessened because of reduced airflow caused by the buildup of ice on the inlet louvers or fill structure of the tower. More particularly, it is concerned with cooling towers including deicing apparatus preferably in the form of an elongated, substantially continuous passageway or slot located in the distribution basin floor adjacent the outer margin thereof, in conjunction with a plurality of elongated, end-to-end, individually actuatable water flow-blocking cover members which can be shifted vertically as needed in order to permit selective flow of hot water through the marginal basin slot in quantities sufficient to create a curtain of cascading hot water adjacent portions of the tower periphery for temporarily blocking ambient air flow therethrough while simultaneously deicing associated sections of the air inlet face of the tower fill structure as well as the adjacent inlet louvers.

Wintertime operation of evaporative water cooling towers in northern climates where sub-freezing ambient temperatures are experienced present a number of difficult problems. One of the most serious problems from the standpoint of tower performance stems from the tendency of evaporative towers to ice up at or adjacent to the air inlet face thereof. In practice, droplets of water, spray, fines and water vapor developed during gravitational flow of initially hot water through the tower fill structure tend to freeze on the marginal surfaces of the tower not directly exposed to the gravitating hot water. In severe instances, the air inlet face to the tower can become clogged to an extent to drastically lessen airflow through the fill structure, and this in turn measurably reduces tower efficiency. The build-up of ice can also represent a significant problem by virtue of damage to the tower components stemming from the weight of the ice. Ice clogging can be particularly troublesome with natural draft towers employing a tall hyperbolic stack for inducing airflow through the tower fill. These towers are generally not provided with fans, as are mechanical draft towers, which can be reversed as needed to deice the air inlet face of the tower.

Moreover, the sub-freezing ambient airflow significantly reduces the effectiveness of measures taken to remove the ice build-up on the inlet face of the tower. This is particularly true in areas where high winds are common during periods of sub-freezing ambient temperatures. Heat transfer from sections of the tower facing the direction of prevailing winds is significantly increased making deicing of these sections extremely difficult.

A number of expedients have been proposed in the past to combat the problem of cooling tower icing. For example, in U.S. Pat. No. 3,117,170, a plurality of shallow, open top troughs extending from the fill structure to the inlet louvers were provided for deicing purposes. In addition, in U.S. Pat. No. 3,322,409, deicing apparatus especially adapted for use in relatively large natural draft towers is disclosed. In this instance basin and conduit means are provided for segregating water flow from the distribution basin so that during wintertime operations relatively large quantities of hot water are directed toward the outer section of the fill and tower structure.

Although deicing apparatus such as those disclosed in the above identified patents have achieved a considerable degree of commercial success, certain problems remain. For example, the water distribution and deicing apparatus disclosed in U.S. Pat. No. 3,322,409 is relatively complex and costly, and is therefore objectionable for these reasons. On the other hand, the water-conveying troughs of U.S. Pat. No. 3,117,170 make it difficult to selectively direct quantities of water for deicing purposes. As can be appreciated, it is generally not necessary or desirable to continuously operate a water cooling tower in a deicing mode, since this can have the effect of lowering overall tower performance and may result in an undesirable buildup of ice elsewhere in the tower structure. Therefore, it is generally desirable to have a means of selectively deicing a water cooling tower as necessary, and preferably this function should be accomplished with a minimum of operator time and labor.

It is therefore the most important object of the present invention to provide a simplified, relatively low cost deicing apparatus for use with essentially all types of evaporative water cooling towers which is designed for easy, effective operation in order to deice the outer margins of the tower as necessary during operations at sustained sub-freezing temperatures, and with a minimum cost in terms of operator time and labor.

Another object of the invention is to provide deicing apparatus usable with both natural draft and mechanical draft evaporative cooling towers and which includes structure defining a hot water passageway in the distribution basin at an area thereof overlying the outer margin of the tower, in conjunction with cover means normally disposed in a flow-blocking disposition to the passageway which is shiftable as desired to initiate and stop flow of water through the deicing passageway; in preferred forms, the basin is configured to present an elongated, substantially continuous peripheral slot adjacent the outer edge of the floor thereof, and a plurality of elongated, end-to-end, individually actuatable cover members are positioned over the slot along with lifting mechanism for vertically shifting the cover members between the flow-blocking disposition thereof and an open position permitting flow of hot water through selected portions of the slot to deice corresponding sections of outer margin of the tower.

Another object of the instant invention is provide deicing apparatus operable to block ambient airflow through selected sections of the tower during deicing of the latter.

In accordance with the foregoing objects, it is yet another important aim of the invention to provide deicing apparatus which include means for establishing direct flow communication between the water-carrying flume and the hot water distribution basin at an elevation corresponding to the bottom of the latter whereby a large volume of hot water in the flume is available for flow through selected portions of the slot in sufficient quantities to create a vertical curtain of water along the corresponding sections of the outer margin to block ambient airflow during deicing of the latter.

In the drawings:

FIG. 1 is a fragmentary view in partial vertical section of a generally annular natural draft crossflow evaporative cooling tower having the deicing apparatus of the present invention;

FIG. 4 is a fragmentary view in partial vertical section of the deicing apparatus of the invention, and illustrating the bladder-controlled cover lifting mechanism thereof;

FIG. 5 is a sectional view taken along irregular line 5—5 of FIG. 4 and further illustrating the construction of the cover lifting mechanism;

FIG. 6 is a fragmentary vertical sectional view illustrating the flow-blocking function of the flexible seal member of the flow-blocking cover;

FIG. 7 is a fragmentary view in partial vertical section of a rectangular mechanical draft crossflow cooling tower having the deicing apparatus of the present invention;

FIG. 9 is a fragmentary plane view of the tower shown in FIG. 8, and illustrating the flow-establishing channels in the wall between the flume and the hot water distribution basin;

FIG. 10 is a fragmentary elevation view illustrating the operation of a channel gate forming a part of the embodiment shown in FIG. 9; and FIG. 11 is a fragmentary plane view of the channel gate shown in FIG. 10.

Figure 8:
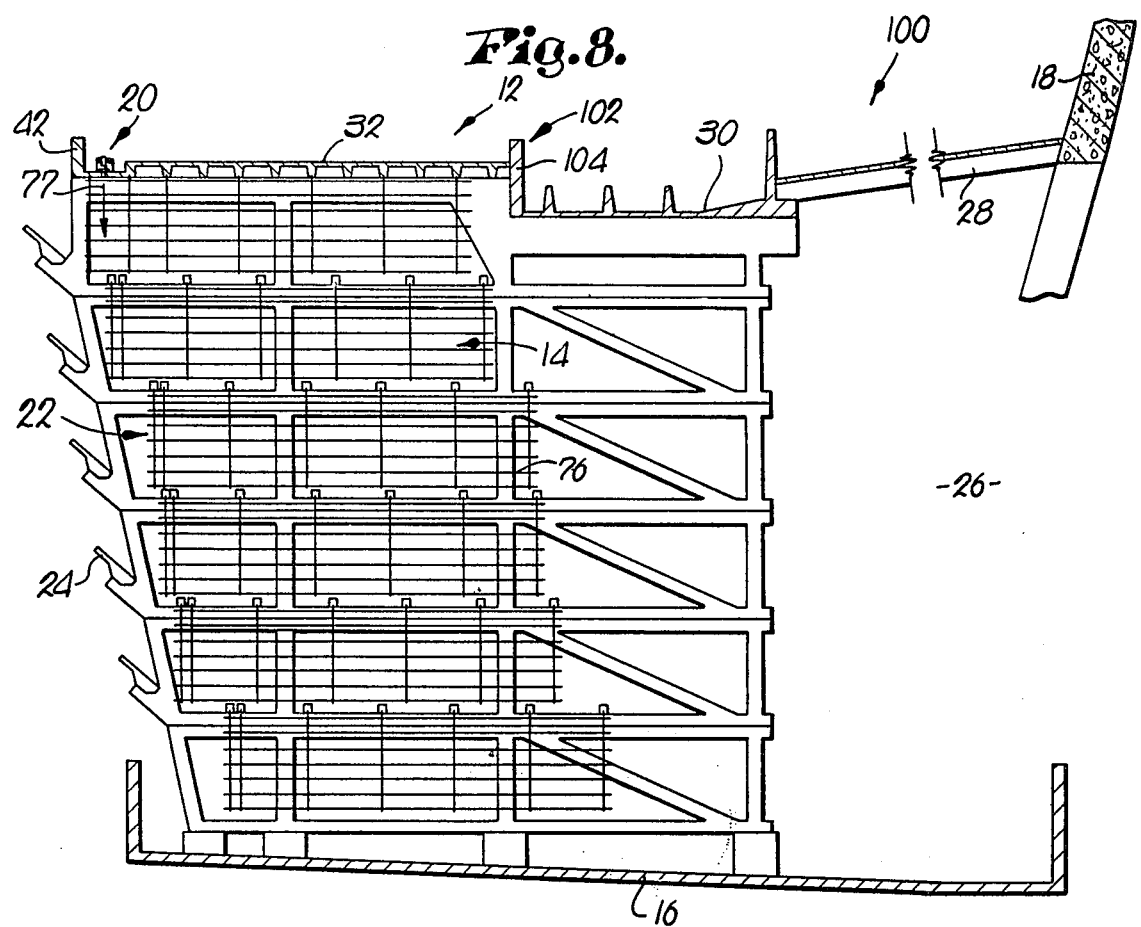
FIG. 8 is a fragmentary view in partial vertical section showing another embodiment of a generally annular natural draft crossflow evaporative cooling tower.
Figure 2:
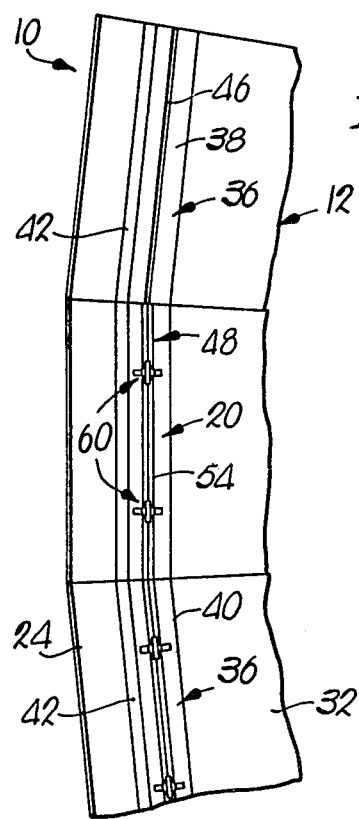
FIG. 2 is a fragmentary plan view of the tower depicted in FIG. 1, and illustrating the peripheral water flow slot, cover members therefor, and cover lift mechanisms.

A generally annular, crossflow, natural draft cooling tower 10 in accordance with the invention is shown fragmentarily in FIGS. 1 and 2. Tower 10 broadly includes an upper hot water distribution basin 12 adapted to receive and distribute hot water to be cooled, evaporative fill structure 14 beneath basin 12, a generally annular cold water collection basin 16 underlying the fill structure, and a hyperbolic stack 18 for directing ambient-derived air currents through the fill structure in intersecting, generally crossflowing relationship to the gravitational flow of water therethrough. In addition, tower 10 is provided with deicing means broadly referred to by the numeral 20 which is operable to selectively deice the outer margin of the tower including the air entrance face 22 of fill structure 14, and the vertically stacked, inclined, circumferentially extending air inlet louvers 24. As is conventional with towers of this type, the outer annular fill portion thereof along with annular canopy section 28 define a central plenum chamber 26 in communication with stack 18. Moreover, water supply means in the form of an annular flume 30 is provided inboard of distribution basin 12 for the purpose of delivering quantities of initially hot water to the latter for dispersal and gravitational flow through fill structure 14 and, as desired, through the deicing means 20.

Figure 3:
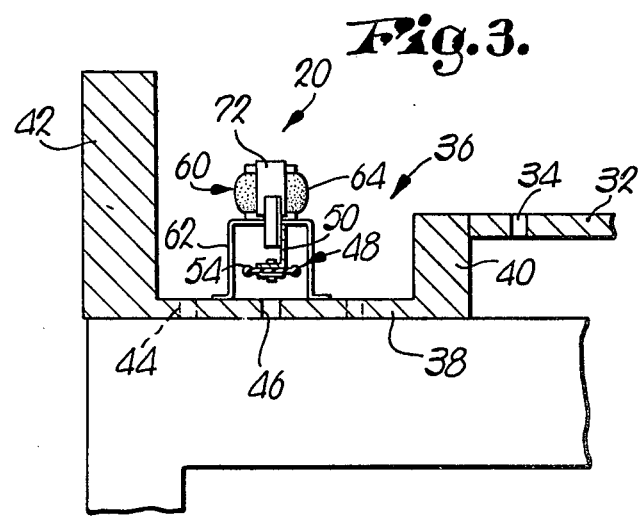
FIG. 3 is an enlarged, fragmentary view in partial vertical section illustrating in detail the deicing apparatus of the present invention as it would appear during deicing operations.

In more detail, it will be seen that distribution basin 12 is made up of a series of floor sections 32 which are apertured as at 34 (see FIG. 3) and positioned in abutting, side-by-side relationship in order to define a generally annular basin. (In actual practice, the radial joints between the floor sections 32 may be filled with grouting for connecting the sections.) The outer margin of each floor section 32 is defined by an elongated, open top section 36 which includes an apertured floor portion 38, an inboard, upstanding wall 40 and a somewhat higher, upstanding outermost peripheral wall 42. As best seen in FIG. 3, the inboard wall 40 of each marginal section 36 abuts the outer edge of a corresponding floor section 32, with floor portion 38 being at a vertical level lower than that of section 32. This orientation of floor portion 38 relative to the remainder of the basin 12 is preferred in the case of natrual draft towers for economy of operation, but is not essential. Finally, it will be seen that basin 12 and flume 30, as well as underlying horizontal splash bar fill structure 14 and outer louvers 24 are supported by an annular prefabricated, sectionalized skeletal frame 33 constructed in accordance with U.S. Pat. No. 3,834,681.

As explained, floor portion 38 of section 36 is apertured as at 44 in order to disperse water entering section 36 for gravitational flow through the underlying portion of fill structure 14. In addition, floor portion 38 is configured to present an elongated, substantially continuous passageway or slot 46 therethrough which may be beveled as depicted and which is sized to permit flow of hot deicing water therethrough in substantially greater quantities than would be possible simply by virtue of the normal operational flow through the apertures 44. The slots 46 in each section 36 are arranged with the slots in adjacent sections so that a substantially continuous circumferentially extending passageway is presented around tower 10. The passageway may in some cases be interrupted by radial grouting applied between the floor portions 38, and thus it may not be fully continuous. An elongated, shiftable cover 48 is positioned over each slot 46 in at least partial water flow-blocking disposition to the latter. The covers 48 are also disposed in an end-to-end fashion for cooperatively covering the circumferential water passageway presented in basin 12.

As best seen in FIGS. 4–6, each cover 48 includes an elongated, generally transversely L-shaped upper support 50 and a spaced, elongated lowermost plate 52. An elongated, flexible, rubber-like seal member 54 is sandwiched between upper support 50 and plate 52, with the three elements being connected together at spaced intervals by means of bolts 56. Each seal member 54 is of length to substantially cover the corresponding underlying slot 46 and is of a width greater than that of the support 50 and plate 52 as best seen in FIG. 6. The seal 54 also includes elongated, marginal beading 58 on both sides thereof which is adapted to engage floor portion 38 on opposite sides of slot 46 in order to effect at least a partial seal of the latter.

Deicing means 20 also includes means for vertically shifting the cover 48 as needed between the normal flow-blocking disposition thereof and an elevated, deicing position permitting flow of water through the underlying slot 46. As best seen in FIG. 2, a pair of lifting mechanisms 60 are provided with each cover 48 so that the latter are individually operable. Each shifting mechanism 60 includes a generally U-shaped, downwardly opening frame member 62 which is attached to floor portion 38 on opposite sides of slot 46 and in bridging relationship to the latter. An expandable bladder 64 is mounted atop the frame member 62 by means of a connective element 65 and is variably fillable with a fluid such as air or nitrogen through an appropriate inlet port 66 therein. A second generaly U-shaped lifting member 68 is secured atop bladder 64 by means of another connective element 70. As best shown in FIGS. 4 and 5, lifting member 68 is positioned crosswise of U-shaped frame member 62 and has depending legs 72 extending toward the upper portion of L-shaped support 50. Short, angled connectors 74 are secured to each depending leg 72 and the underlying support 50 so that the latter, along with the other elements of cover 48, shift vertically with lifting member 68. It will thus be seen that expansion of the bladders 64 will cause the connected covers 48 to rise, while deflation of the bladders will permit the covers to return to their respective flow-blocking positions.

The function of the deicing means 20 is enhanced by flow-establishing means 51 which permits direct water flow from the flume 30 to the distribution basin 12 at an elevation corresponding to that of the floor sections 32. In the preferred embodiment, the flume 30 has an outer annular periphery 53 contiguous with an inner annular periphery 55 of the basin 12 and the flume 30 is dimensioned to normally have a water level 61 which is spaced vertically above the bottom sections 32. The means 51 comprises a generally upright, annular wall 57 substantially coextensive with the peripheries 53 and 55 and having a top 59 disposed at the same elevation as the bottom sections 32 or at a somewhat lower elevation. By this arrangement, water flows virtually unobstructed across the peripheries 53, 55 such that the water level 61 in the flume 30 is substantially the same as the water level 63 in the basin 12.

During normal water cooling operations with tower 10, hot water to be cooled is directed by conventional piping and riser means (not shown) to flume 30, whereupon the water flows across peripheries 53, 55 and enters annular distribution basin 12 until the water level 63 in basin 12 is equal to the water level 61 in flume 30. As water gravitates from the basin 12 through the apertures 34 in the floor sections 32, as well as through the apertures 44 in the floor portions 38 of the outer basin sections 36, it is continuously replaced by flow from the riser means via flume 30. Thus, during normal summertime operations or during winter when deicing is not a problem, a substantially even flow throughout the radial and circumferential extent of basin 12 is accomplished. In this connection it should be noted that some flow of hot water through slot 46 may occur during the normal operating mode without creating problems but in general this flow should not be of sufficient magnitude to significantly disrupt the desirable even design water flow from the tower basin. As is well understood in this art, the hot water gravitating from basin 12 is dispersed upon hitting fill structure 14 and is evaporatively cooled by the crossflowing air currents induced by hyperbolic stack 18. In this regard it is to be understood that any one of a number of conventional fill structures can be used to good effect in the invention. As depicted, a series of elongated, generally horizontally extending splash bars 76 are provided, but vertically oriented film-type fill structure could also be used as well. The cooled water gravitating from fill structure 14 is collected in basin 16 in the conventional manner, and is thereafter returned to the site of use.

When tower 10 is operated during sustained subfreezing conditions and ice develops along the outer marginal edge thereof (i.e., along the louvers 24 and the air entrance face 22 of fill structure 14), the following deicing procedure is followed. First, should it be desired to deice the entire periphery of annular tower 10, the bladders 64 of each lift mechanism 60 are simultaneously or sequentially filled with sufficient fluid to cause the bladders to expand. This fluid may be a liquid antifreeze solution or compressed air, but preferably is gaseous nitrogen. In any event, filling of the respective bladders 64 causes the lifting members 68 to rise as best shown in FIG. 3 which in turn lifts the corresponding covers 48 from their normal water flow-blocking dispostion. This causes a relatively heavy flow of hot water within basin 12 through the slots 46 in order to deice the outer margin of tower 10. Referring to FIG. 1, it will be seen that this deicing water flow (represented by arrow 77) travels down the air entrance face of fill structure 14 and along the lower inlet louvers 24.

Deicing of tower 10 can continue in this fashion until the outer margin thereof is sufficiently deiced to assure relatively unimpeded airflow through fill structure 14. At this point, the respective bladders 64 are deflated which in turn causes the lifting members 68 and connected covers 48 to shift back to the normal flow-blocking dispositions thereof. This shifting procedure can of course be repeated as often as necessary in order to facilitate cold weather operation of tower 10. It should also be noted that it is possible with the deicing apparatus of the present invention to deice only portions of the periphery of tower 10 as the need arises. This would involve merely actuating only those lift mechanisms 60 overlying the areas of the tower to be deiced, while the remaining covers remain in place.

At this point, it is important to understand the significance of the flow-establishing means 51 and particularly its contribution to the overall operation of the deicing means 20. In this connection, note that the water in the flume 30 above the level of floor sections 32 is placed in direct flow communication with the basin 12 by the means 51. Thus, this additional volume of water is available for maintaining the head required to cause cascading of water from the selected slots 46 in sufficient volume to define a vertical wall or curtain of water which precludes air flow through the inlet louvers 24 to the fill structure 14. Hence, the deleterious ice-forming effects of the inflowing ambient air are virtually eliminated during the deicing operation such that the latter is completed faster and more efficiently. Moreover, the staggered arrangement of the vertically offset inlet louvers 24 intercepts the cascading water at a number of spaced vertical locations such that the water is prevented from reaching its terminal velocity and hence, the integrity of the water curtain is maintained along the full height of the tower 10. That is to say, the falling water is precluded from attaining a velocity which would reduce the density of the water curtain sufficiently to permit air flow therethrough.

When deicing only a portion of the tower 10 at a time, as when concentrating on a particularly heavy iced section or progressively deicing sections around the outer periphery, the curtain defining water cascade may be maintained virtually indefinitely such that the high efficiency deicing can continue as long as needed to effect deicing of any particular section of the tower 10. In this connection, the unique arrangement of the flow-establishing means 51 permits water from other portions of the tower 10 to be directed to the slots 46 overlying the particular section being deiced such that a constant supply of water is provided for creating the desired airflow-blocking water curtain.

Although the deicing apparatus in accordance with the invention has been described in connection with an annular, crossflow, natural draft cooling tower, it is to be understood that the invention is not so limited. For example, and referring specifically to FIG. 7, it will be seen that an elongated, mechanical draft tower 78 can be provided which incorporates the concepts of the present invention. Of course, other types of mechanical draft towers such as the round or annular variety may also include the deicing apparatus hereof. Tower 78 includes an elongated, generally rectangular, sectionalized upper hot water distribution basin 80 having an apertured floor 82, in conjunction with underlying, horizontal splash bar evaporative fill structure 84, and a lower cold water collection basin (not shown). Tower 78 is of generally rectangular configuration and includes conventional casing structure 86 which defines an internal plenum chamber 88. A mechanically powered fan 90 circumscribed by a venturi-shaped velocity recovery stack 92 is mounted atop structure 86 and communicates with plenum chamber 88. As is well understood in this art, fan 90 is operable to pull crossflowing air currents through fill structure 84 in intersecting, thermal interchange relationship to the hot water gravitating from basin 80 for efficient, evaporative cooling of the hot water.

In this instance, the outer marginal sections of basin floor 82 are at the same level vertically as the corresponding inboard portions of the floor sections. However, the outer portions are cooperatively configured to present an elongated, substantially continuous slot 92 which extends substantially the entire length of rectangular basin 80; as with the passageway of tower 10 however, slot 92 may be interrupted by radial grouting applied between the floor sections. As in the case of tower 10, a series of abutting, end-to-end cover sections are provided in overlying disposition to the slot 92, with a plurality of individually operable lifting mechanisms 60 for raising and lowering the covers as needed to deice tower 78. The preferred lifting mechanisms 60 employed with tower 78 are identical in every respect to those used in tower 10, and therefore a description of these mechanisms will not be repeated. In addition, the deicing operation of tower 78 is essentially identical with that decribed above in connection with tower 10 and involves selectively raising the slot covers as needed to permit gravitational flow of deicing water along the outer margin to the tower.

In FIGS. 8–11 there is depicted an alternate embodiment of the present invention in the form of a natural draft cooling tower 100 identical in all respects to the tower 10 with the exception of the flow-establishing means 51. Tower 100 has an analogous flow-establishing means 102 which includes an annular wall 104 coextensive with the peripheries 53, 55, similar to the wall 57 of means 51. Wall 104 however, projects above the floor sections 32 to segregate the flume 30 from the basin 12.

A number of water flow control slots 106 are provided at circumferentially spaced locations along the wall 104 for establishing fluid communication between the flume 30 and basin 12 at the elevation of the floor sections 32. In preferred forms the slots 106 are symmetrically arranged in close side-by-side relation to collectively present an annular series of openings through the wall 104. Each slot 106 comprises a generally rectangular notch 108 in the upper portion of the wall 104; the bottom of each notch 108 being flush with a respective floor section 32. A vertically reciprocable gate 110 is provided for each notch 108 to permit selective adjustment of flow through the slots 106. Each slot 106 has mechanical pin and hole assembly 112 as shown in FIGS. 10 and 11 for retaining its respective gate 110 in a desired position.

In operation, the slots 106 are adjusted to effect even water flow from flume 30 to the basin 12 along the full circumference presented by the wall 104. Typically, it is necessary to dispose the gates 110 at various levels depending upon the location of the respective associated slots 106 on the wall 104. In any event, once the position of the gates 100 is adjusted such that a uniform water level is present in the annular basin 12, it is not normally necessary to reposition the gates 110 unless the basic operating characteristic of the tower 100 should change.

Deicing of tower 100 is similar to deicing of the tower 10 as described hereinabove. The arrangement of the slots 106 provides the slot 46 with the additional volume of water required to create the aforementioned advantageous water curtain during deicing of the tower 100.

We claim:
1. A water cooling tower comprising:
   a hot water distribution basin having a generally horizontal bottom wall;
   fill structure beneath said distribution basin for dispensing hot water gravitating from the latter for enhancing the evaporative cooling of the hot water;
   a cold water collection basin beneath said fill structure for collecting cooled water gravitating from the latter;
   means for directing ambient derived air currents through said fill structure for cooling of the hot water gravitating therethrough;
   selectively actuable deicing means for deicing the outer margin of said tower, including
      horizontal, elongated slot means extending through the bottom wall of the distribution basin at an area of said bottom wall generally parallel to and overlying the outer margin of said tower,
      said slot means being configured and arranged for downward delivery of sufficient quantities of hot water therethrough directly onto at least a portion of said outer margin of the tower to effect deicing thereof under cold weather conditions;
   elongated, shiftable cover means overlying said slot means in at least partial water flow-blocking disposition thereto; and
   selectively actuatable means for shifting said cover means as desired from said flow-blocking disposition to a deicing position permitting free flow delivery of hot water through said slot means, and for selective return of said cover means to said flow-block disposition when deicing of the tower is complete;
   an annular, hot water carrying flume disposed horizontally adjacent said distribution basin for delivery of hot water thereto,
   said flume being configured to maintain a water level spaced above said bottom wall of the distribution basin; and
   means for establishing fluid flow communication between said distribution basin and said flume at an elevation corresponding to the elevation of said bottom wall such that the water in said flume above said bottom wall is available to maintain an adequate water head for providing a flow of hot water through said slot means sufficient to create a substantially continuous, vertically extending curtain of water along selected portions of said outer margin of the tower whereby air flow therethrough is temporarily blocked to enhance the deicing properties of the hot water.

2. The cooling tower as set forth in claim 1 wherein said air-directing means is operable for directing said air currents through said fill structure in generally cross-flowing, intersecting relationship to the gravitational flow of water therethrough.

3. The cooling tower as set forth in claim 2 wherein said air-directing means comprises a hyperbolic stack for pulling said air currents through said fill structure.

4. The cooling tower as set forth in claim 2 wherein said air-directing means comprises powered fan means for pulling said air currents through said fill structure.

5. The cooling tower as set forth in claim 1 wherein said slot means comprises an elongated, substantially continuous slot located adjacent the outer margin of said distribution basin.

6. The cooling tower as set forth in claim 1 wherein said bottom wall has an outer section at a lower level vertically than the remainder of said bottom wall, said slot means being located in and extending along such lower level section.

7. The cooling tower as set forth in claim 1, said flume and said distribution basin being provided with respective peripheries contiguous with one another, said flow-establishing means including an upright wall coextensive with said peripheries, said upright wall being disposed at an elevation no greater than that of said bottom wall adjacent said peripheries whereby unobstructed fluid flow is permitted between said flume and said distribution basin.

8. The cooling tower as set forth in claim 1, said flume and said distribution basin being provided with respective peripheries contiguous with one another, there being a dividing wall between the flume and distribution basin along said peripheries, said flow-establishing means including a number of spaced, flow control slots in said dividing wall, each slot having a bottom coplanar with the bottom of said distribution basin.

9. The cooling tower as set forth in claim 8, said flow-establishing means includes an adjustable gate for each slot, said gates being operable to control the flow through respective slots.

10. The cooling tower as set forth in claim 9, said peripheries and said dividing wall being substantially annular.

* * * * *